United States Patent [19]
Huber

[11] Patent Number: 4,949,837
[45] Date of Patent: Aug. 21, 1990

[54] DRIVE ROLLER UNIT

[75] Inventor: Thomas Huber, Iffeldorf, Fed. Rep. of Germany

[73] Assignee: Bavaria Cargo Technologie GmbH, Munich, Fed. Rep. of Germany

[21] Appl. No.: 377,971

[22] Filed: Jul. 11, 1989

[30] Foreign Application Priority Data

Aug. 19, 1988 [DE] Fed. Rep. of Germany ....... 3828232
Feb. 21, 1989 [DE] Fed. Rep. of Germany ..... 89102955

[51] Int. Cl.$^5$ ............................................. B65G 13/02
[52] U.S. Cl. .................... 198/782; 198/788; 244/137.1
[58] Field of Search ...................... 244/137.1; 198/781, 198/782, 788, 787, 413

[56] References Cited

U.S. PATENT DOCUMENTS

| | | | |
|---|---|---|---|
| 3,565,233 | 2/1971 | Hinman | 198/782 |
| 3,712,454 | 1/1973 | McKee | 198/782 |
| 3,978,975 | 9/1976 | Herbes et al. | 244/137.1 X |
| 4,050,655 | 9/1977 | Bogue et al. | 244/137.1 |
| 4,301,984 | 11/1981 | Olason | 244/137.1 |
| 4,589,542 | 5/1986 | Steadman | 198/782 |
| 4,697,694 | 10/1987 | Huber | 198/782 |
| 4,792,037 | 12/1988 | Huber | 198/788 |
| 4,819,782 | 4/1989 | Fenner | 244/137.1 X |

FOREIGN PATENT DOCUMENTS

| | | |
|---|---|---|
| 2851920 | 6/1980 | Fed. Rep. of Germany . |
| 1548481 | 7/1979 | United Kingdom . |

*Primary Examiner*—Joseph J. Rolla
*Assistant Examiner*—D. Glenn Dayoan
*Attorney, Agent, or Firm*—Sughrue, Mion, Zinn, Macpeak & Seas

[57] ABSTRACT

A drive roller unit for driving articles such as freight containers on a conveyor track comprises first and second drive rollers which can be driven in rotation. The drive rollers are arranged in juxtaposed relationship in their axial direction and in the drive position thereof are both in engagement with the bottom of the article to be moved. A motor assembly for driving the drive rollers is coupled thereto by way of a differential transmission. One output of the differential transmission drives one drive roller of the pair while the other output of the differential transmission drives the other drive roller. The arrangement of the drive rollers, motor assembly and transmission is mounted rotatably about a vertical axis, and the unit has a mechanism for producing a predetermined braking effect both in respect of the differential pinions of the differential transmission and also in respect of the rotary movement about the above-mentioned vertical axis, thereby to provide that, when movement of the article is impeded during for example the operation of loading same into an aircraft freight compartment, a rotary movement of the arrangement is produced, which causes the article to move angularly stepwise into a desired position. The unit can be used for loading containers into the freight compartment of an aircraft, when the containers must not only be moved into the freight compartment transversely with respect to the longitudinal axis of the aircraft, but at the same time they must also be turned through an angle of up to 90°.

8 Claims, 4 Drawing Sheets

DRIVE ROLLER UNIT

BACKGROUND OF THE INVENTION

The present invention relates generally to a drive roller unit for driving articles on a conveyor track.

One form of drive roller unit for driving articles on a conveyor track comprises at least one drive roller which can be driven in rotation by an electric motor assembly, by way of a transmission means, and which in its drive position is in engagement with the underside of the article to be driven thereby. Such drive roller units are employed for example for driving freight containers which are to be movable on roller-type or ball-type conveyor tracks. A preferred area of use of such arrangements are freight loading systems in air freight traffic, in which the containers are transported in the freight compartment of an aircraft on such conveyor tracks until the containers reach the anchorage locations at which they are to be held fast during a flight.

A drive roller unit of the kind referred to above is disclosed for example in U.S. Pat. No. 4,792,037 (Ser. No. 160,427). It comprises a single drive roller which, by means of an electric motor assembly incorporated therein, can firstly be lifted from a lowered rest position in which it is out of contact with an article on the conveyor track until it reaches a raised operative position in which it bears against the underside of the article to be driven thereby for movement on the conveyor track. In the raised position that drive roller can then be driven in rotation by the same electric motor assemby so that it applies to the underside of the article on the track a tangential force which displaces it in a direction substantially normal to the direction of the axis of rotation of the drive roller.

When loading freight containers into the freight compartments of an aircraft, the problem which now arises is that the elongated containers which are frequently longer than the width of the freight compartment of the aircraft must be pushed into the freight compartment with one of their narrow sides leading, through a cargo hatch in the side of the vehicle, and then, when in the freight compartment, turned through 90° so that they can then be moved with their longitudinal axis parallel to the longitudinal axis of the vehicle, until they reach the required anchorage location. For the purposes of introducing the containers through the cargo hatch and for turning them through 90°, the floor of the freight compartment was equipped for example in the region of the cargo hatch with a ball-type conveyor track which permits the container to move in all directions and be rotated as indicated above. The ball-type conveyor track included a large number of drive rollers which can be raised and lowered between a rest position and an operative position and which can then be driven in rotation when in the operative position. Suitable control by means of complicated electronic control assemblies meant that such an arrangement could be used to pass the container into the cargo hatch and turned at the same time through 90° during that movement. That operation was effected by the individual drive roller units being selectively raised and lowered; in the lowered condition they performed a rotary movement about a vertical axis while in the raised condition they moved the container forwardly in its turned position.

In practice such an arrangement was found to be complicated and expensive while it also suffered from being of high weight, which is undesirable in the context of air freight traffic, and it was also found to be susceptible to trouble.

In another prior-art construction, more particularly containers of smaller size could be moved manually on the ball-type conveyor track which was disposed in the region of the cargo hatch, and also manually rotated thereon. Instead of ball-type conveyor tracks, some arrangements also employed assemblies of guide rollers which were arranged to cover a suitable area over which the containers were to be moved. It will be seen therefore that the previous arrangements either involved a considerable level of expenditure and complication, to provide for a semi-automated procedure, or it was necessary to use human physical force to effect a container loading operation.

SUMMARY OF THE INVENTION

An object of the present invention is to provide a drive roller unit for driving articles on a conveyor track which is of a simple and inexpensive construction and of low weight.

Another object of the invention is to provide a conveyor track drive roller unit which is capable of automatically effecting the change in direction of an article to be driven thereby, which is required to turn same about its vertical axis.

In accordance with the present invention, these and other objects are achieved by a drive roller unit for driving an article on a conveyor track, comprising at least first and second drive rollers which can be driven in rotation by an electric motor means by way of a transmission means and which in their drive position are in engagement with the underside of the article to be driven. The first and second drive rollers are arranged with their axes of rotation substantially transversely with respect to the direction of drive of the article and in juxtaposed relationship in their axial direction. The transmission means includes a differential transmission, wherein the input thereof is driven by the electric motor means and one output thereof drives the one drive roller and the other output thereof drives the other drive roller. Provided for at least one differential pinion of the differential transmission is a brake which brakes said differential pinion with respect to the casing of the differential transmission with a defined braking moment of such a magnitude that the first and second drive rollers rotate in the same direction as long as the article to be driven can be moved substantially unbraked or unimpeded beyond the drive roller unit. The first and second drive rollers and the differential transmission are mounted in a holding means mounted rotatably about a vertical axis with respect to the base structure of the conveyor track.

In accordance with the design configuration of the present invention therefore, a drive roller unit has two co-operating drive rollers which are coupled together by way of a differential transmission. The arrangement of the invention is based on the realisation that it is possible for the braking moments at the differential pinions of the differential transmission to be so selected that in a first operating condition of the drive roller unit according to the principles of the present invention, there is a virtually 'rigid' coupling between the two outputs of the differential transmission, which provides that the first and second drive rollers rotate in the same direction and also, in the preferred situation in which they are of the same outside diameters, at the same speed. In that first operating condition the first and second drive rollers therefore operate practically like a single drive roller as described in above-mentioned U.S. Pat. No. 4,792,037. The drive roller unit of the invention retains that operating condition as long as the reaction forces which are applied to the two drive rollers by the article to be driven thereby do not exceed a level which is predetermined by the braking moments at the pinions of the differential transmission. In accordance with the invention those braking moments are so adapted to the weight of the articles to be driven and to the resistances which are to be overcome upon free movement thereof on the conveyor track, that the drive roller unit remains in the above-described first operating condition as long as the article to be driven on the conveyor track is not subjected to a very severe braking effect due to external influences, or is not prevented from moving in the direction in which it was previously moving. A braking effect as referred to above will occur automatically for example when a container to be loaded into the freight compartment of an aircraft through a cargo hatch in the side thereof has been moved into the freight compartment to such an extent that at the side thereof remote from the cargo hatch, the container encounters the side wall of the aircraft or a suitable guide arrangement disposed at that location, and therefore can no longer move any further in its previous direction of movement, that is to say across the freight compartment.

The braking moments produced at the pinions in the differential transmission are overcome by the strong braking effect which is applied to the drive roller in the above-outlined situation where the container encounters the opposite side wall of the aircraft from the cargo hatch, and the previous virtually 'rigid' coupling between the first and second drive rollers of the drive roller unit is eliminated. As a result the drive roller unit automatically changes into a second operating condition in which the first and second drive rollers begin to rotate in opposite directions, as occurs at the outputs of a differential transmission when one of the two outputs is locked or subjected to a very substantial braking effect.

In the drive roller unit of the present invention, one of the first and second drive rollers continues to rotate in its previous direction in the second operating condition of the unit, while the other drive roller begins to rotate in the reverse direction. Due to those opposite rotary movements of the drive rollers which continue to be pressed into engagement against the underside of the article or container to be moved on the conveyor track, a turning moment about a vertical axis is produced. By virtue of the drive roller unit being mounted in such a way as to be capable of rotating about a vertical axis, the turning moment produced results in a corresponding rotary movement which moves the drive roller unit into a fresh angular position in relation to the longitudinal axis of the freight compartment. That rotary movement continues until the drive roller unit occupies a position in which the article to be moved thereby, for example a container, being unimpeded or subjected to a lesser braking effect than previously, can then again move on over at least a certain distance in the direction of forward movement which is now defined by the fresh angular position that the drive roller unit has taken up following the rotary movement referred to above. During that procedure, the article or container can be simultaneously turned somewhat about a vertical axis into the new direction in which the drive roller unit is to drive the article or container. As in that fresh position of the drive roller unit the forces which subject the article or container to a substantial braking effect, from outside sources, or which can totally prevent the article or container from moving any further, disappear or are at least reduced, the article applies lower reaction forces to the drive roller unit so that it automatically returns to its first operating condition in which the first and second drive rollers rotate in the same forward direction. In that situation, the article to be driven by the drive roller unit of the invention will generally not perform a complete rotary movement through 90° in a single operation. On the contrary, the above-discussed procedure will be repeated, with the article again encountering a wall or partition of the freight compartment or a corresponding abutment so that the drive roller unit is again caused to pass into its second operating condition and is thereby further rotated about the vertical axis referred to above.

That change between the first and second operating conditions may take place on a number of occasions until the article to be moved is finally turned through a sufficient angle, for example 90°, and can then be unimpededly moved in that fresh position along the longitudinal axis of the freight compartment until it reaches the required anchoring location.

It will be seen from the foregoing discussion of the mode of operation of the drive roller unit of the invention that the rotary movement of the drive roller unit about its vertical axis is produced automatically by the interplay of the mutually adapted braking moments, without any necessity for intervention in the operating procedure, for example by means of an electronic control arrangement.

In a preferred embodiment of the drive roller unit according to the invention, the input of the differential transmission is one of two mutually oppositely disposed bevel pinions which are connected together by way of the differential pinions, with the other of the two bevel pinions forming one output of the differential transmission which thus drives one of the two drive rollers, while the casing of the differential transmission forms the other output thereof, to drive the other of the two drive rollers.

It is further preferably provided that the drive roller unit has a brake which brakes the holding means with a defined braking moment in its rotary movement about the vertical axis with respect to the base structure of the conveyor track.

In a particularly advantageous embodiment, the axes of rotation of the first and second drive rollers are parallel to each other while in a particular case of such a construction, the axes of rotation of the two drive rollers may be in mutually aligned coaxial relationship and the drive rollers are in the external shape of circular cylinders of the same diameter.

The drive roller unit of the invention can be of a particularly compact configuration if the electric motor means, the transmission means, the differential transmission and the brake are arranged in the interior of the drive rollers which are in the form of hollow bodies.

In another particularly advantageous embodiment, the rotor of the electric motor means drives, by way of a step-down transmission and the differential transmission, an internally toothed ring gear means of a drive roller. The said ring gear means is coupled to an output of the differential transmission while the other output thereof drives an internally toothed ring gear means of the other drive roller. Another embodiment of a drive roller unit which provides for a particular degree of simplification in the structure and control thereof provides that the drive roller unit is of such a configuration that, when the electric motor means is switched on, the first and second drive rollers of the unit automatically lift out of a lower rest position into an upper drive position in which they are in driving engagement with the underside of the article to be driven.

Further objects, features and advantages of the present invention will be apparent from the following description of preferred embodiments thereof.

DESCRIPTION OF PREFERRED EMBODIMENTS

Figure 1:
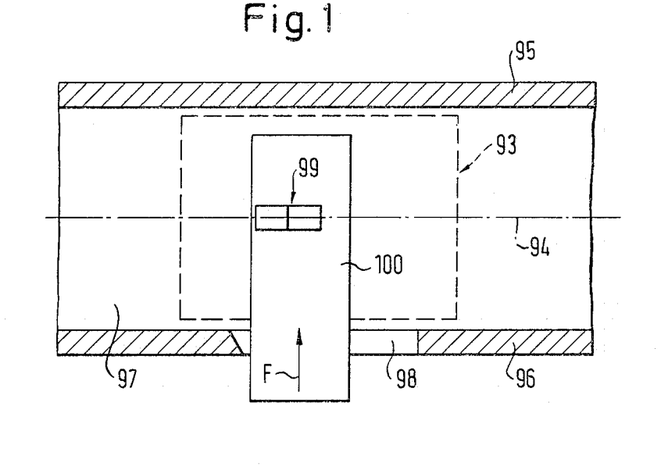
FIGS. 1 and 2 are diagrammatic plan views of a part of an aircraft freight compartment with a cargo hatch through which a container is moved into the freight compartment.
Figure 2:
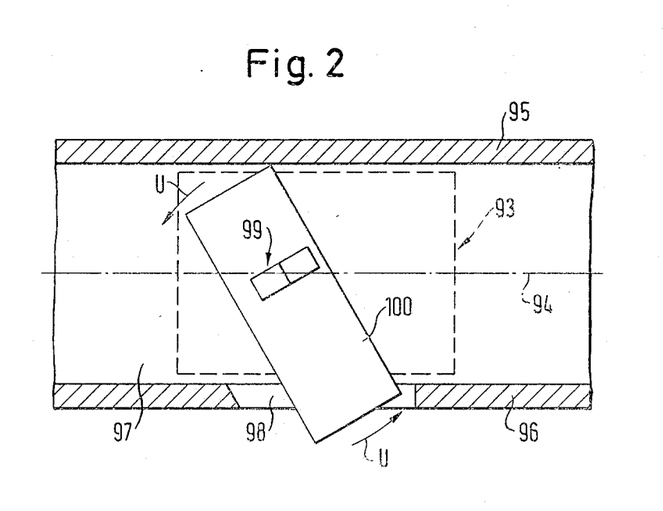

Referring firstly to FIGS. 1 and 2, shown therein is a situation of use of a drive roller unit according to the present invention.

FIGS. 1 and 2 are diagrammatic plan views of the entrance region of the freight compartment 97 of an aircraft, into which an article such as a container 100 is to be loaded. The container 100 is firstly moved up to the aircraft on a ball-type or roller-type conveyor track (not shown) and moved into the cargo hatch 98 of the freight compartment 97. In the region of the hatch 98 the floor of the freight compartment 97 is equipped for example with a ball-type conveyor track or another conveyor track which permits the container 100 to move in all directions. The region of the freight compartment 97 in which the ball-type or other conveyor track is disposed is indicated by the broken-line rectangle at 93 in FIGS. 1 and 2.

On the conveyor track 93 the container 100 can firstly be moved perpendicularly to the longitudinal axis of the aircraft into the freight compartment 97, with the application of a comparatively small amount of force, as indicated by the arrow F in FIG. 1. Arranged in the region of the conveyor track 93 is at least one and preferably a plurality of drive roller units 99 in accordance with the invention. One drive roller unit 99 is symbolically indicated in FIGS. 1 and 2.

As shown in FIG. 1 therefore the container 100 is firstly moved in the direction indicated by the arrow F with its narrow side leading, that is to say in the direction of its longitudinal axis, normal to the longitudinal axis 94 of the aircraft, through the cargo hatch 98 and into the freight compartment 97. However the length of the container 100 in that direction of movement is greater than the width of the freight compartment 97, that is to say it is longer than the internal spacing between the front side wall 96 of the aircraft fuselage, which is at the bottom in FIGS. 1 and 2, and the other side wall 95 which is at the top in FIGS. 1 and 2. The container 100 must therefore be rotated about one or more vertical axes in the direction indicated by the arrows U in FIG. 2, so that the container can move through the cargo hatch 98 into the freight compartment 97 and, in the interior of the freight compartment 97, can be oriented with its longitudinal axis parallel to the longitudinal axis 94 of the aircraft.

Figure 3:
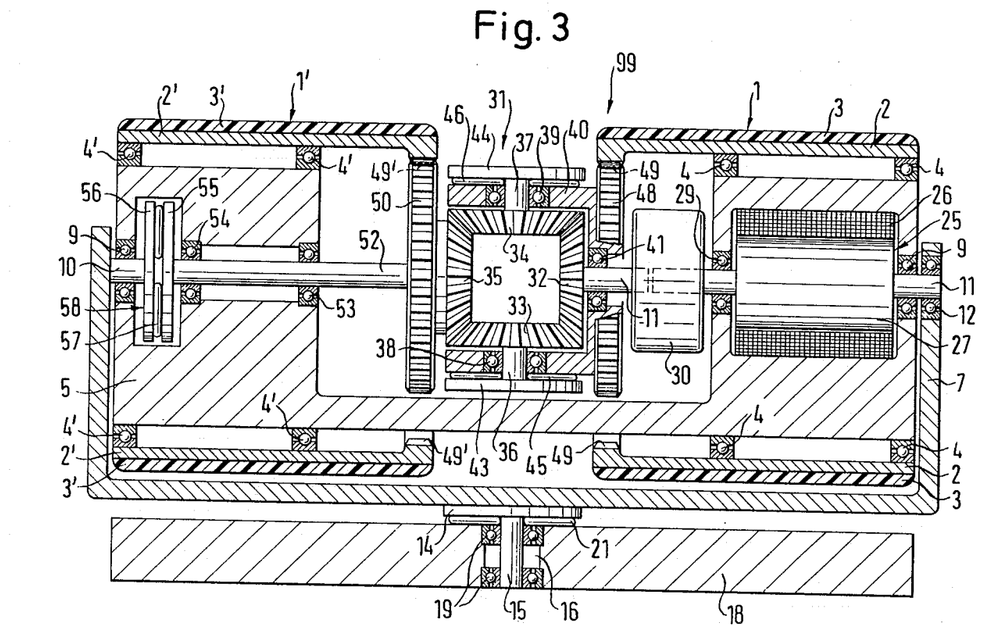
FIG. 3 is a highly simplified and diagrammatic view of a drive roller unit to explain and describe the structure and operating principle in accordance with the present invention.

Before now describing the way in which the container 100 is moved into the freight compartment 97 in the direction indicated by the arrow F and also turned through 90° by means of one or more drive roller units 99 according to the invention, the basic structure thereof will now be described with reference to the diagrammatic view in FIG. 13.

Referring therefore now to FIG. 3, as shown in the highly diagrammatic view of the drive roller 99 therein, it comprises two drive rollers 1 and 1' which are of the same diameter and which are arranged in coaxially juxtaposed relationship. Each drive roller 1 and 1' comprises an inner roller body 2 and 2' which is substantially in the form of a hollow cylinder and a roller casing portion 3, 3'0 of wear-resistant elastic material, which covers the outer surface of the roller body 10.

The two drive rollers 1 and 1' are mounted rotatably on and in concentric relationship with the circular-cylindrical outside circumferential surface of a roller carrier 5, by means of bearings 4 and 4' which, like all bearings referred to hereinafter, may be in the form of rolling bearings, for example needle or ball bearings.

The roller carrier 5 has recesses and cavities in which further components of the drive roller unit 99 according to the invention are disposed, as will be described in greater detail hereinafter.

As shown in FIG. 3, the roller carrier 5 is mounted by means of bearings 9 in an upwardly open holding means 7 which is of U-shaped configuration in the illustrated cross-section. The bearing 9 which is shown at the left in FIG. 3 is supported on a shaft journal or stub axle 10 which is rigidly secured to the holding means 7 while the bearing 9 shown at the right in FIG. 3 is supported on a shaft which in turn is mounted rotatably with respect to the holding means 7 by means of a bearing 12 at the extreme right-hand end of the shaft 11. The centre lines or axes of rotation of the shaft portion 10 and the shaft 11 are aligned with each other and extend parallel but eccentrically with respect to the axis of the circular-cylindrical outer peripheral surface of the roller carrier 5. If therefore the roller carrier 5 is turned with respect to the holding means 7, it pivots together with the drive rollers 1 and 1' mounted thereon, in the manner of an eccentric, out of the lower rest position shown in FIG. 3 upwardly into the drive position in which the drive rollers are pressed against the bottom of the container 100.

At the middle of its underside, the holding means 7 is fixedly connected to a plate 14 which in turn is secured to a vertically downwardly projecting shaft 15. The shaft 15 extends through a vertical bore 16 in a base structure 18 in which it is mounted rotatably about its vertical axis by bearings 19. Disposed between the underside of the plate 14 and the top surface of the base structure 18 is a plurality of rollers which, with the plate 14 and the top surface of the base structure 18, form a friction brake 21 which opposes a defined braking movement to any rotary movement of the holding means 7 with respect to the base structure 18, so that such a rotary movement takes place only when the torque driving it is sufficiently high to overcome the braking moment of the brake 21. A brake 21 of that kind, in the form of a roller friction brake, is described in greater detail in above-mentioned U.S. Pat. No. 4,792,037, to which reference is hereby expressly made for the purposes of appropriate disclosure.

Reference numeral 25 in FIG. 3 denotes an electric motor assembly which is disposed in a cavity in the roller carrier 5 on the right-hand side thereof in FIG. 3. The electric motor arrangement 25 has stator windings 26 which are fixedly connected to the roller carrier 5 and which in known fashion concentrically enclose a rotor 27 with a small radial spacing therebetween. The rotor 27 is nonrotatably connected to the shaft 11 and, by way of same and the bearing 12, is mounted in the holding means 7 rotatably eccentrically with respect to the circular-cylindrical outside circumferential surface of the roller carrier 5.

The part of the shaft 11 which extends towards the left in FIG. 3 and which is rotatably supported on the roller carrier 5 by way of a bearing 29 drives a bevel pinion 32 which forms the torque input member of a differential transmission 31. The shaft 11 may drive the bevel pinion 32 either directly or, if appropriate, by way of a step-down transmission which is only diagrammatically indicated at 30 in FIG. 3. The bevel pinion 32 is drivingly connected to a second bevel pinion 35 in the usual manner in relation to differential transmissions by way of differential pinions of which FIG. 3 shows only two, namely the pinions 33 and 34. As the structure and mode of operation of a differential transmission of that kind are generally known to a man skilled in the art, only a brief description thereof will be set out hereinafter.

The differential pinions 33 and 34 are each mounted rotatably in a casing 40 of the differential transmission 31 by way of respective shafts 36 and 37 and bearings 38 and 39. The casing 40 of the differential transmission 31 is in turn supported rotatably on the shaft 11 by way of a bearing 41. The shafts 36 and 37 extend through the casing 40 to the exterior thereof where they are each connected to a respective plate 43 and 44; a respective diagrammatically indicated friction brake 45 and 46 respectively is disposed between each plate 43, 44 and the casing 40. A similar construction also applies in regard to the other two differential pinions which are not visible in FIG. 3. The friction brakes 45 and 46 (and likewise the friction brakes (not shown) on the other differential pinions (also not shown) each produce a defined braking moment relative to the casing 40 so that in a first operating condition which, like a second operating condition which will be different therefrom, will be described in greater detail hereinafter, there is a quasi 'rigid' drive connection between the two bevel pinions 32 and 35 and the casing 40, being therefore a condition in which all those components rotate jointly, that is to say in the same direction and at the same speed, about the axis of rotation defined by the shaft 11 and the shaft portion 10.

In FIG. 3 the differential transmission 31 is disposed approximately centrally between the first and second drive rollers 1 and 1'. A first drive pinion 48 which is fixedly connected to the housing 40 of the differential transmission 31 is in meshing engagement with an internally toothed ring gear portion 49 which is formed on the hollow roller body 2 of the drive roller 1, concentrically with respect to the hollow roller body 2, in the vicinity of the left-hand axial end thereof, at the inwardly facing surface thereof. In a corresponding fashion, a second drive pinion 50 is fixedly connected to the second bevel pinion 35 and is in meshing engagement with an internally toothed ring gear portion 49' which is formed on the hollow roller body 2' of the drive roller 1' concentrically with respect of the roller body 2' at the inwardly facing surface thereof in the vicinity of the right-hand axial end thereof.

The axes of rotation of the two drive pinions 48 and 50 coincide with the axis of rotation defined by the shaft 11 and are thus eccentric with respect to the axis of symmetry, which forms the axis of rotation of the drive rollers 1 and 1', of the circular-cylindrical outer circumferential surface of the roller carrier 5. With that arrangement, the meshing engagement of the two drive pinions 48 and 50 with the respectively associated internally toothed ring gear portions 49 and 49' is always ensured even when, by virtue of the eccentric mounting of the roller carrier 5 on the holding means 7, the roller carrier 5 pivots in performing a rotary movement from the lower rest position shown in FIG. 3 upwardly into its operative position.

The second drive pinion 50 is non-rotatably connected to a brake disc 55 by way of a shaft 52 which extends towards the left in FIG. 3 coaxially with respect to the shaft 11 on the side of the drive pinion 50 which is remote from the differential transmission 31, with the shaft 52 being mounted rotatably in the roller carrier 5 by means of two bearings 53 and 54. Arranged in concentric relationship therewith on the end of the shaft portion 10 which is towards the right in FIG. 3 is a corresponding brake disc 56 which is mounted non-rotatably with respect to the holding means 7. Braking rollers 57 are arranged between the two brake discs 55 and 56. The two brake discs 55 and 56 and the rollers 57 together form a friction brake 58 which is referred to as a roller friction brake, as described in above-mentioned U.S. Pat. No. 4,792,037 and which produces for the drive pinion 50 a defined braking moment in regard to its rotary movement relative to the holding means 7.

In regard to the above-mentioned first operating condition in which the braking moments in respect of the differential pinions of the differential transmission 31 are not overcome so that the two drive pinions 48 and 50 rotate in the same direction and at the same speed, the arrangement shown in FIG. 3 can be considered as though the roller bodies 2 and 2' of the two drive rollers 1 and 1' were non-rotatably connected together and were driven by way of a single internally toothed ring gear portion 49 or 49' by a single drive pinion 48 or 50 which in turn is driven by the electric motor arrangement 25 and which is braked with a defined braking moment by way of the friction brake 58. In that operating condition the arrangement shown in FIG. 3 corresponds in terms of its function to the drive roller unit as described in greater detail in above-mentioned U.S. Pat. No. 4,792,037, the content of which is hereby fully incorporated into the disclosure of the present application.

In the first operating condition just referred to above, the arrangement of the present application therefore operates in the same manner as the above-mentioned drive roller unit of the prior patent, as follows:

If, with the drive roller unit in the rest position shown in FIG. 3, the supply of power to the electric motor arrangement 25 is switched on, then a torque is operative between the rotor 27 and the stator arrangement formed by the stator windings 26 and the roller carrier 5, in the same manner as in relation to any other electric motor. Due to the considerable inherent inertia of the rotor 27, the inherent inertia of the parts of the differential transmission 31 (and if provided, the interposed step-down transmission 30), the inherent inertia of the transmission assembly formed by the drive pinions 48 and 50 and the internally toothed ring gear portions 49 and 49', and the inherent inertia of the drive rollers 1 and 1' as well as the frictional forces in the transmission assembly and the differential transmission 31, the rotor however initially remains in a stationary condition and the torque of the motor 25 causes the stator arrangement 5 and 26 to rotate in opposition to the intended direction of rotation of the rotor 27. By virtue of the eccentric mounting thereof with respect to the holding means 7, the roller carrier 5 and therewith the drive rollers 1 and 1' pivot upwardly about the axis of rotation defined by the mounting thereof on the shaft portion 10 and the shaft 11, until the drive rollers 1 and 1' come to bear against the underside of the article, for example a container 100, which is disposed on a conveyor track in which the drive roller unit 99 is installed, as was described hereinbefore in relation to FIGS. 1 and 2. Because of the weight of the container 100, the upwardly directed pivotal movement of the drive rollers 1 and 1' is blocked so that the stator arrangement 5 and 26 is also unable to perform any further rotary movement. The result of that is that the rotor 27 is caused to rotate, against the above-mentioned inertia and friction forces which were initially preventing it from rotating. The rotary movement of the rotor 27 is transmitted in the same direction to the drive pinons 48 and 50 by way of the shaft 11 and the differential transmission 31 which initially acts as a direct connection, and the drive pinions 48 and 50 drive the ring gear portions 49 and 49' and therewith therefore the drive rollers 1 and 1' in the same direction. The rotary movement of the drive rollers 1 and 1' which are urged against the underside of the container 100 applies a tangential force to the container 100 so that the container 100 is moved in the direction indicated by the arrow F in FIG. 1, or is moved again in that direction if it has already moved previously in that direction.

In the above listing of the forces which initially prevent the rotor 27 of the electric motor arrangement 25 from rotating at the commencement of supplying power to the electric motor arrangement 25 in the initial condition in which the roller carrier 5 is in its lowered rest position as shown in FIG. 3, so that the stator arrangement comprising the field windings 26 and the roller carrier 5 must rotate and pivot upwardly with an eccentric movement, the braking moment of the friction brake 58 was disregarded because that friction brake 58 is not absolutely necessary in accordance with the present invention. It is however advantageous for the reason that it provides for a defined braking moment which acts on the rotor 27 at the start of operation of the unit and assists in initially holding it in a stationary condition when the supply of power to the electric motor arrangement 25 is switched on with the drive roller unit 99 in its rest condition. In that way manufacturing tolerances, wear phenomena and the like can be disregarded in relation to the operability of the drive roller unit 99 as in fact the fraction brake 58 provides a defined braking moment in any set of circumstances. In addition the provision of the fraction brake 58 means that it is possible to keep down the level of inherent inertia of the rotor 27, the differential transmission 31, the transmission arrangement and the drive rollers 1 and 1' and therewith also the weight thereof. As diagrammatically indicated, the friction brake 58 is in the form of a mechanical brake; for example it can be designed in the form of a roller friction brake in which a plurality of braking rollers 57 are subjected to a spring prestressing force between brake discs 55 and 56 which are rotatable relative to each other with the braking rollers 57 being distributed around the periphery of the brake discs 55 and 56, as described above.

The drive roller unit 99 remains in the above-described first operating condition in which the first and second drive rollers 1 and 1' rotate in the same direction and at the same speed and thus drive the container 10 forwardly in the same manner as a single drive roller, until such high forces are opposed by the container 100 to the rotary movement of the first and second drive rollers 1 and 1' that the braking moments produced by the friction brakes 45 and 46 (and the friction brakes (not shown) acting at the other differential pinions in the differential transmission) at the casing 40 of the differential transmission 31 are overcome. That occurs for example when the container 100 cannot be moved any further in the direction indicated by the arrow F in FIG. 1 because its leading end has come to bear against the side wall 95 of the freight compartment 97 or a suitable guide abutment disposed at that location.

However as soon as the friction moments of the brakes of the differential pinions 33 and 34 of the differential transmission 31 are overcome, the drive roller unit 99 in accordance with the present invention makes the transition into a second operating condition. In that second operating condition the quasi 'rigid' coupling between the two drive pinions 48 and 50 is eliminated and the drive pinons 48 and 50 now begin to rotate in opposite directions, as usually happens in a differential transmission in which one of the outputs thereof is stopped. In that situation the drive pinion 48 continues to rotate in its previous direction so that the drive roller 1 continues to rotate forwardly to continue to move the container 100 in its forward direction while the other drive pinion 50 reverses its direction of rotation so that the drive roller 100 begins to rotate in the reverse direction. Those mutually opposite rotary movements of the two drive rollers 1 and 1' which are in rolling contact against the underside of the container 100 give rise to a torque about the vertical axis of the shaft 15, and the torque becomes progressively greater because the electric motor arrangement 25, by a correspondingly increasing current draw, seeks to maintain the rotary movement as between the rotor 27 and the stator arrangement 5, 26. If the torque about the vertical axis becomes greater than the defined braking movement produced by the friction brake 21 which, as discussed above, can be of a similar design to the friction brake 58, then the drive roller unit 99 rotates by a certain amount in the counter-clockwise direction in the plan view of FIGS. 1 and 2, about the shaft 15. By virtue of that fresh rotary position which is now directed in the counter-clockwise direction towards the longitudinal axis of the freight compartment, from the direction in which the assembly was previously oriented, the forces engaging the bottom of the container supported on the drive roller unit 99 act on same in a direction which is turned in the counter-clockwise direction and in which lower braking forces act against movement of the container.

As a result the container also applies lower reaction forces to the drive roller unit 99 so that the forces involved fall again to a level below the braking moments of the friction brakes 45 and 46 and the drive roller unit 99 falls back into its first operating condition. As a result the two drive rollers 1 and 1' again rotate in the same direction and drive the container 100 forwardly in its new inclined direction. In that situation, it slides with its front right-hand corner as shown in FIGS. 1 and 2 along the side wall 95 of the freight compartment and in so doing is turned in the direction indicated by the arrows U in FIG. 2.

If therefore the container 100 can slide along the side wall 95 by virtue of the drive roller unit 99 being in its fresh rotary position as referred to above, it is no longer completely prevented from moving in that way and its braking action applied to the drive rollers 1 and 1' is so greatly reduced that the forces involved are below the braking moments of the friction brakes 45 and 46 of the differential pinions of the differential transmission 31. The unit therefore returns to the first operating condition in which the drive rollers 1 and 1' again rotate in the same direction, although the drive roller unit 99 has been turned in the counter-clockwise direction relative to the original direction of drive movement as indicated by the arrow F in FIG. 1. The drive roller unit 99 initially remains in that fresh rotated position. The container 100 is moved forward in that fresh direction by the drive roller unit 99 which is now operating in its first operating condition, until the container 100 is again braked so greatly, by virtue of its front right-hand corner bearing against the side wall 95, that the drive rollers 1 and 1'are again braked so substantially that the drive roller unit 99 makes the transition into the second operating condition in the same manner as already described above. As a result it is again turned by a further distance in the counter-clockwise direction to take up a fresh rotary position in which the braking effect of the container 100 in turn decreases so that it can again move in the fresh direction of movement along the side wall 95 of the freight compartment, and can turn in the direction indicated by the arrows U. As a result the drive roller unit 99 goes back again into its first operating condition and drives the container 100 in the fresh rotary position thereof until the container 100 is again substantially braked by encountering an increased resistance to its continuing movement.

The above-described alternation between the first and second operating conditions of the unit is repeated a number of times until finally the longitudinal axis of the container 100 extends parallel to the longitudinal axis 94 of the aircraft or the side wall 95 thereof and the container 100 can then be unimpededly moved in that direction in the frieght compartment 97 to the position in which it is to be disposed.

If the supply of power to the electric motor arrangement 25 is switched off just before the container 100 has moved off the drive roller unit 99, the rotor 27 comes to a halt and the roller carrier 5 and the drive rollers 1 and 1' mounted thereon move downwardly again by pivoting about the shaft 11, by virtue of their eccentrically mounted weight, and move into the rest position shown in FIG. 3 in which the drive rollers 1 and 1' are no longer in contact with the underside of the container 100.

The reverse rotary movement of the drive roller unit 99 out of its position in which it is now disposed approximately transversely with respect to the longitudinal axis 94 of the aircraft into its initial position as shown in FIG. 1 can be produced in any appropriate fashion. There are a number of possible ways in which that movement can be produced. For example, the return movement can be produced by a spring (not shown) which biases the drive roller unit 99 to cause it to return to the initial position of FIG. 1. The spring acts to produce a rotary movement in the clockwise direction as viewing FIG. 1, about the shaft 15 illustrated in FIG. 3. If a return spring of that kind is used, it is possible to omit the friction brake 21 on the shaft 15 as the braking moment is then produced by the return spring. Another possible way of producing the return movement of the drive roller unit 99 into the initial position shown in FIG. 1 provides that the drive roller unit 99 which is now disposed transversely with respect to the longitudinal axis of the aircraft is caused to rotate back into the initial position by the next following container which is to be loaded into the freight compartment 97. More specifically if the next following container 100 encounters the drive roller unit 99 while it is still in its position of having been turned through 90° from the position thereof shown in FIG. 1, the bottom surface of the container initially only brakes the one drive roller 1 whereas the container does not yet come into contact with the other drive roller 1'. As a result the drive roller unit goes into its second operating condition and is thus rotated back into its initial position.

The construction illustrating the principles of the invention, as diagrammatically illustrated in FIG. 3 and described hereinbefore by way of example of the invention concerns a drive roller unit 99 in which both drive rollers 1 and 1' are mounted coaxially on a common roller carrier 5 which eccentrically accommodates the electric motor arrangement which produces both the lifting or pivotal movement of the unit at the beginning of operation of the assembly directly after the current is switched on, and also the rotary drive movement of the drive rollers 1 and 1' in the two operating conditions of the unit, together with the rotary movement of the drive roller unit 99 about the vertical axis of the shaft 15. It should be noted however that other constructions are also possible within the scope and framework of the concept of the present invention. The principle of the present invention only requires that first and second drive rollers 1 and 1' which can be jointly pressed from below against the article to be moved such as a container 100 are adapted to be driven in the described manner by an electric motor arrangement by way of a differential transmission with braked differential pinions, and that the holding means which carries the first and second drive rollers is mounted rotatably about a vertical axis.

It is therefore entirely possible for the torque required for lifting the drive rollers 1 and 1' to be produced and transmitted to the drive rollers in some other suitable fashion. That may also be the case, irrespective of production and transmission of the torque required for rotating the rollers about the vertical axis. The electric motor or motors required for driving the drive roller unit may also be arranged outside the drive rollers and may or may not also move when the unit performs the rotary movement about its vertical axis. The important consideration is that the transmission of the drive moment or moments can take place in any angular position of the drive roller unit.

Furthermore the external shape of the roller bodies does not necessarily have to be that of a circular cylinder as it is possible to envisage conical shapes or frusto-conical shapes or shapes which are of a barrel-like cambered configuration. Furthermore the axes of rotation of the first and second roller bodies do not have to be aligned with each other nor do they have to extend parallel to each other. The outside diameters of the drive rollers also do not necessarily have to be the same. If that is not the case, it is only necessary to provide that the smaller-diameter roller is lifted out of its lowered rest position to a somewhat greater extent than the larger-diameter roller so that both rollers come to bear against the underside of the aritcle or container to be moved, approximately at the same time. The axial lengths of the drive rollers of a drive roller unit may also be different from each other.

The step-down transmission 30 which is provided as an optional component in the arrangement illustrated in FIG. 3 may be for example in the form of a three-stage planetary transmission means as described in above-mentioned U.S. Pat. No. 4,792,037. If the unit uses an electric motor which can produce the required levels of torque at correspondingly low speeds of rotation, the step-down transmission 30 may also be totally omitted.

Figure 4:
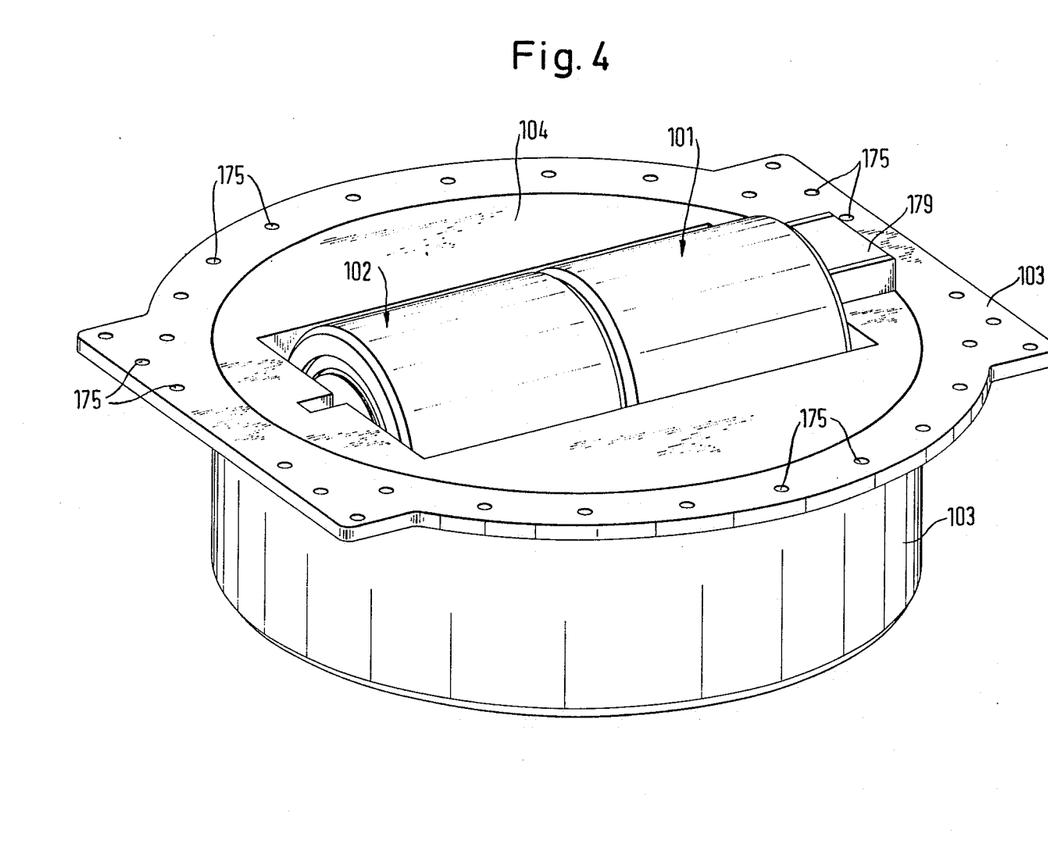
FIG. 4 is a perspective view of a practical embodiment of a drive roller unit in accordance with the present invention.
Figure 5:
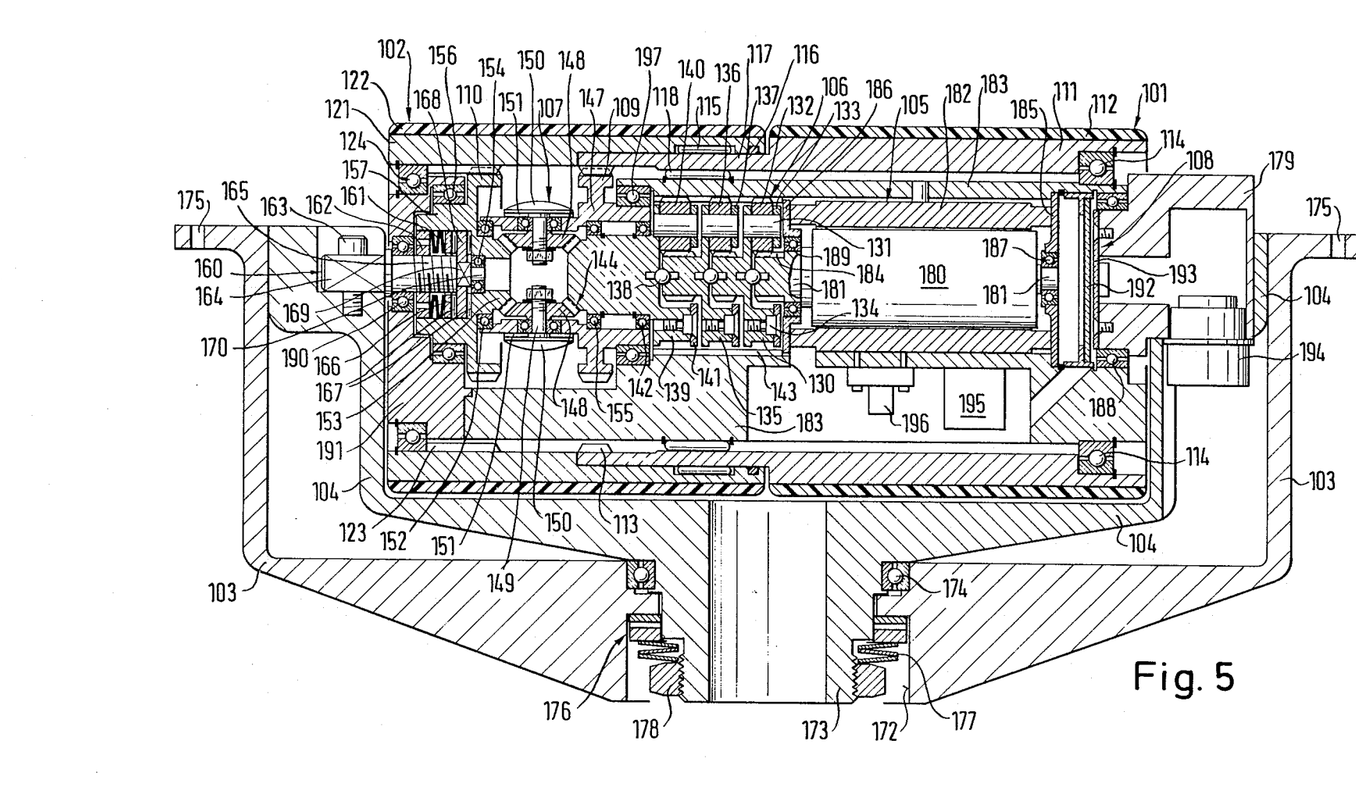
FIG. 5 is a simplified view in axial section through the embodiment of the drive roller unit shown in FIG. 4.

Reference will now be made to FIGS. 4 and 5 showing a practical embodiment of the drive roller unit according to the invention, which is however illustrated in somewhat simplified form in some details thereof. As many structural details of the embodiment illustrated in FIGS. 4 and 5 are similar to the drive roller unit described in above-mentioned U.S. Pat. No. 4,792,037, reference is hereby expressly made to the disclosure therein, thereby to incorporate same into the present description.

As shown in FIGS. 4 and 5, the drive roller unit illustrated therein comprises first and second drive rollers 101 and 102 which are arranged in mutually axially aligned concentric juxtaposed relationship and which are mounted in a holding means 104 rotatably about their common horizontal axis. The holding means 104 is of a circular configuration in plan view and is mounted rotatably about a vertical axis in a housing 103 which serves as a base structure. The housing 103 is of a cup-like configuration and has a horizontal peripheral flange with fixing holes 175 for receiving bolts and for anchoring the housing 108 in an opening of suitable shape in the floor of a freight compartment.

The holding means 104 has a centrally downwardly projecting mounting projection or trunnion portion 173 which is mounted rotatably about a vertical axis by means of a rolling bearing 174 in a central opening 172 in the housing 103. A roller friction brake 176 which is disposed in the opening 172 opposes against the rotary movement about a vertical axis, a predetermined braking torque which can be adjusted by the prestressing of the diaphragm springs 177 by means of a nut 178 which is screwed on to the lower end of the mounting projection 173.

As shown in particular in axial longitudinal section in FIG. 5, this embodiment of the drive roller unit includes first and second outer drive rollers 101 and 102 which are of a substantially hollow-cylindrical configuration and which are arranged in axially juxtaposed relationship, an electric motor arrangement 105 which is accommodated in the interior of the drive rollers 101 and 102, a step-down transmission 106 which axially adjoins the electric motor arrangement 105 to the left thereof in FIG. 5, and a differential transmission 107 which in turn adjoins the step-down transmission 106 axially towards the left in FIG. 5.

The electric motor arrangement 105 includes a stator asembly comprising a stator body 182 which embraces the stator winding, and a stator housing 183 which is fixedly connected to the stator body 182 and which is in the form of a roller carrier. The stator body 182 with its winding is of a substantially rotationally symmetrical configuration in conventional manner and concentrically surrounds the rotor 180 at a small spacing therefrom. The stator housing 183 which is in the form of the roller carrier has an outer circumferential surface which is generally formed substantially as a circular cylinder and extending therethrough is a bore which is eccentric with respect to the axis of the circular cylinder. The eccentric bore accommodates the stator body 182 which is non-rotatably connected to the stator housing 183 but which extends only through the part of the bore which is shown at the right in FIG. 5. Adjacent the end of the bore which is at the right in FIG. 5 is a radial mounting plate 185 which is non-rotatably connected to the stator housing 183 and which carries a rolling bearing 187 which is concentric with respect to the rotor 180. As viewed in the axial direction of that assembly, disposed outside the bearing plate 185 adjoining the right-hand axial end of the stator housing 183 and within the through bore therein is a further rolling bearing 188 which is concentric with respect to the rolling bearing 187. A further mounting plate 186 is also arranged approximately at the middle of the bore which passes through the stator housing 183. The mounting plate 186 is also non-rotatably connected to the stator housing 183 and carries a rolling bearing 189 which is concentric with respect to the bore through the stator housing 183.

At the end face of the stator housing 183 which is at the left in FIG. 5, a radial mounting flange 191 is secured to the end face of the stator housing 183, terminating in flush relationship therewith, by means of bolts which are not shown in the drawing. The mounting flange 191 carries a rolling bearing 190 which is concentric with respect to the longitudinal axis of the bore through the stator housing 183 and which serves to mount the stator housing 183 on a mounting trunnion 160 which is anchored in the holding means 104.

The rolling bearing 188 at the right-hand end of the stator housing 183 is carried on a mounting support 179 so that the entire stator arrangement 182 and 183 is rotatably mounted on the mounting support 179 on the one hand and on the mounting trunnion 160 on the other hand. The mounting support 179 is fixedly connected to the holding means 104.

The mounting trunnion 160 at the left-hand end of the stator body 182 is provided with a square projection 164 which projects outwardly, towards the left in FIG. 5, and hwich is non-rotatably anchored to the holding means 104 by means of a screw 163.

The rotor 180 of the electric motor arrangement 105 is accommodated in the usual way within the stator body 182 which is non-rotatably connected to the stator hosuing 183. The rotor 180 is carried concentrically and non-rotatably on a rotor shaft 181 which extends beyond the rotor body 182 at both axial ends thereof. The end of the rotor shaft 181 which projects outwardly towards the left in FIG. 5 is mounted rotatably with respect to the stator housing 183 by means of the rolling bearing 189 while the end of the rotor shaft 181 which projects out of the rotor body 182 at the right-hand thereof is mounted rotatably in the through bore in the stator housing 183 by means of the rolling bearing 187.

A contact assembly for supplying power to the electric motor arrangement 105 is illustrated in simplified form at 108. A structurally similar contact assembly is described in greater detail in above-mentioned U.S. Pat. No. 4,792,037 to which attention is therefore directed for fuller details of the construction. Stated in brief terms, the contact assembly 108 in the present construction comprises a slip ring carrier 192 which is disposed at the right-hand end in the bore through the stator housing 183 and which is fixedly connected thereto, and a contact carrier 193 which is displaced axially towards the right in parallel relationship with the carrier 192 and which is secured to the mounting support 179 and thus to the holding means 104. On its surface which is axially towards the right in FIG. 5, the carrier 192 carries a plurality of slip ring portions which are fixedly connected electrically to the corresponding terminals of the electric motor arrangement and which rotate therewith. On the other hand, the left-hand axial side of the contact carrier 193 is provided with contacts which bear resiliently against the slip ring portions and which are electrically connected to a plug 194 which is disposed in the mounting support 179 and by way of which power can be supplied to the unit, in conjunction with a releasable plug assembly.

As can be seen from FIG. 5, in the region of the electric motor arrangement 105 the stator housing 183 is additionally provided with a further cavity or recess which on the one hand serves to reduce the weight of the assembly and which on the other hand can possibly accommodate components such as a relay 195 and a thermally operated automatic circuit breaker 196.

The two drive rollers 101 and 102 are each substantially in form of a hollow circular cylinder and are disposed concentrically around the stator body 182. The first drive roller 101 shown at the right in FIG. 5 comprises a roller casing portion 112 of wear-resistant elasic material and a roller body 111 of metal, which carries the roller casing portion 112. At its region at the left in FIG. 5 the roller body 111 has a portion 117 of reduced diameter, with an internally toothed ring gear poriton 113 being formed at the left-hand axial end at the inside of the reduced-diameter portion 117. In the region of its reduced-diameter portion 117 the first drive roller 101 is mounted by means of a needle bearing 118 on the outside of the stator body 182 and at its axial end which is at the right in FIG. 5, it is mounted with a rolling bearing 114 on the outside surface, which is disposed therebeneath, of the stator housing 183.

The second drive roller 102 which is shown at the left in FIG. 5 also comprises a roller casing portion 122 carried on a roller body 121. The materials involved are the same as those used in the first drive roller 101. The roller casing portion 122 of the second drive roller 102 has a portion of reduced thickness which is shown at the right in FIG. 5 and with which the reduced-diameter portion 117 of the first drive roller 101 is in overlapping relationship. The roller casing portion 122 is rotatably mounted by means of a needle bearing 115 on the outside of the reduced-diameter portion 117 of the first drive roller and is sealed by means of a sealing ring 116 to prevent the ingress of moisture and/or dirt or contamination material. At the left-hand end in FIG. 5 the second drive roller 102 is rotatably mounted by means of a rolling bearing 124 on the mounting flange 191 which connected to the stator housing 183.

The first and second drive rollers 101 and 102 are therefore rotatably mounted in mutually concentric relationship on the stator housing 183 and can perform a relative rotary movement relative to each other at the same time.

Starting from the rolling bearing 124 towards the right in FIG. 5, formed at the inside surface of the roller body 121 of the second drive roller 102 is an internally toothed ring gear portion 123 which is in meshing engagement with the second drive pinion 110.

Disposed within the bore which passes eccentrically through the stator housing 183, at the left in FIG. 4 of the mounting plate 186 which supports the rotor shaft 181 is a step-down transmission 106 in the form of a planetary transmission with three transmission stages which are disposed in succession in the axial direction of the assembly. That planetary transmissionis of a conventional design configuration from the point of view of the function thereof so that the following brief description is sufficient to arrive at an adequate understanding thereof, for the purposes of the present invention. Moreover the design configuration of this planetary transmission is similar to that described in above-mentioned U.S. Pat. No. 4,792,037.

The planetary transmission, in the first stage which is at the right in FIG. 5, includes a first planet wheel carrier 130 which is fixedly connected at its right-hand end by means of bolts 134 to a radial mounting disc 133. Three planet wheels 132 are mounted on shafts 131 in the disc 133 and an axially oppositely disposed mounting flange of the first carrier 130. The planet wheels 132 rotate in mesh with a sun gear which is formed by an external tooth configuration 184 on the left-hand end of the rotor shaft 181.

The sun gear of the second transmission stage which is next following axially towards the left in FIG. 5 is formed in one piece with the planet wheel carrier 130 of the first stage in the form of an external tooth configuration. The planet wheel carrier 135 of the second transmission stage is again fixedly connected by means of bolts 134 to a radial mounting disc 137 and the planet wheels 136 of the second stage are rotatably mounted on shafts 131 on the one hand in the disc 137 and on the other hand in the oppositely disposed radial flange of the planet wheel carrier 135 and mesh with the external tooth configuration on the first planet wheel carrier 130 acting as the sun gear of the second transmission stage.

The sun gear of the third transmission stage is in turn formed as an external tooth configuration on an integral extension, which extends axially towards the left, of the planet wheel carrier 135 of the second transmission stage. The planet wheel carrier 139 of the third transmission stage is again fixedly connected by way of bolts 134 to a radial mounting disc 141 and planet wheels 140 of the third transmission stage are mounted on shafts 131 on the one hand in the disc 141 and on the other hand in an oppositely disposed radial flange of the third planet wheel carrier 139 and mesh with the external tooth configuration of the second planet wheel carrier 135 of the second planetary transmission stage, in the form of the sun gear of the third transmission stage.

Over the entire region of the step-down transmission 106 the inside wall of the eccentric bore extending through the stator housing 183 is provided with internal teeth 143 which mesh with the planet wheels 132, 136 and 140, as the crown or ring gear. In that construction therefore the common crown or ring gear of the three transmission stages of the planetary transmission is formed in one piece with the stator housing 183, thus saving weight and reducing the number of individual components required.

For the purposes of reducing the friction between the individual transmission stages, a bearing ball 138 is arranged between the end face of each sun gear which is towards the left in FIG. 5, and the next adjoining member of the arrangement, for example the next planet wheel carrier.

As shown in FIG. 5 the planet wheel carrier 139 of the third transmission stage is extended axially towards the left to provide a hub-like configuration. That hub-like part of the carrier 139 is mounted by means of the rolling bearings 142 and 155 at the inside surface of a portion, which surrounds the hub part, of the differential casing 147 of the differential transmission 107 which adjoins it axially towards the left in fIG. 5. At the end of the hub part of the third carrier 139, which is entirely at the left in FIG. 5, the peripheral edge carries a bevel tooth configuration representing the first bevel gear 144 of the differential transmission 107.

The differential transmission 107 comprises in the usual way four differential pinions 148 which are mounted in the differential casing 147 and which are in meshing engagement with the first bevel gear 144. At its right-hand end in FIG. 5, the differential casing 147 is mounted by way of the rolling bearing 197 at the inside surface of the bore which passes through the stator housing 183. FIG. 5 shows only two of the differential pinions 148 which are each mounted rotatably in the differential casing 147 by means of a respective shaft 149. Arranged on the outside of the differential casing 147 on each shaft 149 is a respective friction plate 150 which brakes the associated differential bevel pinion 148 by way of a brake 151 relative to the differential casing 147, with the application of a predeterminable braking torque.

At the side which is axially towards the left in FIG. 5 the differential pinions 148 are in meshing engagement with the second bevel pinion 153 which is mounted by means of a rolling bearing 152 at the inward surface of the surrounding portion of the differential casing 147. The second bevel pinion 153 is also supported rotatably and coaxially with respect to the mounting trunnion 160 in concentric relationship on a cylindrical projection 170 at the outermost right-hand end of the mounting trunnion 160, by means of a further rolling bearing 154. The second bevel pinion 153 continues axially towards the left in FIG. 5 in the form of a hollow circumferentially extending flange 157 which is rotatably mounted in concentric relationship at its outside by way of rolling bearings 156 in the mounting flange 191 which is fixedly connected to the stator housing 183. The flange 157 has an externally toothed ring gear portion representing the second drive pinion 110 which meshes with the internally toothed ring gear portion 123 on the second drive roller 102.

Between the end of the step-down transmission 106 which is at the left in FIG. 5, and the axially right-hand end of the differential transmission 107, the differential casing 147 is provided with a radially outwardly projecting externally toothed ring gear portion which as the first drive pinion 109 is in meshing engagement with the internal tooth configuration 113 of the first drive roller 101.

Therefore, it will be seen that the differential casing is coupled by way of the first drive pinion to the internally toothed ring gear poriton of the first drive roller while the second bevel pinion which represents the second output of the differential transmission 107 is coupled by way of its externally toothed ring gear poriton as a second drive pinion to the internally toothed ring gear portion 123 of the second drive roller.

Provided in the left-hand part of FIG. 5, in the interior of the hollow circumferentially extending flange 157 of the second bevel pinion 153, is a roller friction brake whichis of a very similar design configuration to that described in above-mentioned U.S. Pat. No. 4,792,037. The roller friction brake produces a predeterminable and defined braking moment between the mounting flange 191 which is fixedly connected to the stator housing 183, and the mounting trunnion 160 which is rigidly connected to the holding means 104. More particularly, as illustrated, the friction brake includes a brake disc 168 which is non-rotatably mounted within the flange 157 on a square portion 169 of the mounting trunnion 160 and which is supported at its right-hand end face in FIG. 5 by way of a plurality of braking rollers 167 against the face, which is towards same, of the second bevel pinion 153. The face of the brake disc 168 which is towards the left in FIG. 5 bears by way of a further plurality of braking rollers 167 against a pressure plate 166 which loosely rotatably surrounds a cylindrical portion 165 of the mounting trunnion 160. The pressure plate 166 is biased axially towards the right in FIG. 5 by way of a plurality of diaphragm springs 161 and a nut 162 which is screwed on to the cylindrical portion 165 of the mounting trunnion 160. So that both the braking rollers which are to the right of the brake disc 168 in FIG. 5 and also the braking rollers which are towards the left thereof can be subjected to the desired pressure force by suitable adjustment of the nut 162, both the disc 168 and the pressure plate 166 are axially displaceable.

As the mode of operation of the embodiment described hereinbefore with reference to FIGS. 4 and 5 is identical to that of the embodiment diagrammatically illustrated in and described with reference to FIGS. 1 through 3, attention is directed to the description relating to FIGS. 1 through 3 for full details of the mode of operation involved.

It will be appreciated that the above-described constructions have been set forth solely by way of example and illustration of the present invention and that various modifications and alterations may be made therein without thereby departing from the spirit and scope of the invention.

What is claimed is:

1. A drive roller unit (99) for driving an article on a conveyor track, comprising:
    first and second drive rollers (1, 1') arranged with their axes of rotation substantially transversely with respect to the direction of drive of the article (100) to be driven and in juxtaposed relationship in their axial direction, the drive rollers (1, 1') having a drive position in which they are in engagement with the underside of the article (100) to driven;
    an electric motor means (25);
    a transmission means (30, 31, 48, 49 49', 50) including a differential transmission (31) having an input (32) drivingly connected to the electric motor means (25), a first output (40) drivingly connected to one drive roller (1) and a second output (35) drivingly connected to the other drive roller (1');
    a brake means (45, 46) operatively associated with at least one differential pinion (33, 34) of the differential transmission (31) for braking said pinion (33, 34) with respect to a casing (40) of the differential transmission (31) with a defined braking moment which is of such a magnitude that the drive rollers (1, 1') rotate in the same direction as long as the article (100) to be driven thereby can move substantially unimpededly beyond the drive roller unit (99), and a holding means (7) which carries the drive rollers (1, 1') and the differential transmission (31) and which is mounted rotatably about a vertical axis with respect to a base structure of the conveyor track with which the drive roller unit (99) is adapted to be used.

2. A drive roller unit as set forth in claim 1 wherein said differential transmission (31) has first and second mutually opositely disposed bevel pinions (32, 35) and wherein said one and another differential pinions (33, 34) interconnect said bevel pinions (32, 35), wherein said first bevel pinion (32) forms the input of the differential transmission (31), wherein the second bevel pinion (35) forms the second output of the differential transmission (31) to drive the other of the drive roller (1') and wherein the casing (40) of the differential transmission (31) forms the first output of the differential transmission (31) to dirve the one of the drive roller (1).

3. A drive roller unit as set forth in claim 1 and further including a brake means (21) adapted to brake the housing means (7) with a defined braking moment in its rotary movement about said vertical axis.

4. A drive roller unit as set forth in claim 1 wherein the axes of rotation of the drive rollers (1, 1') are parallel to each other.

5. A drive roller unit as set forth in claim 4 wherein the axes of rotation of the drive rollers (1, 1') are in mutually aligned coaxial relationship and wherein the drive rollers (1, 1') are of the external shape of circular cylinders of the same diameter.

6. A drive roller unit as set forth in claim 1 wherein the drive rollers (1, 1') are in the form of hollow bodies and the electric motor means (25), the transmission means (30, 31, 48, 49, 49', 50), the differential transmission (31) and the brake means (45, 46) operatively associated with the at least one differential pinion (33, 34) of the differential transmission (31) are arranged in the interior of the drive rollers (1, 1').

7. A drive roller unit as set forth in claim 2 including a step-down transmission means (30) operatively disposed between said electric motor means (25) and said differential transmission (31), wherein said other drive roller (1') has an internally toothed ring gear means (49') which is drivingly coupled to the second output (35) of the differential transmission (31) and wherein the one drive roller (1) has an internally toothed ring gear means (49) which is drivingly coupled to the first output (40) of the differential transmission.

8. A drive roller unit as set forth in claim 1 wherein said drive rollers (1, 1') are adapted to be moved between a lowered rest position and a raised drive position in which they are engageable with the underside of the article (100) to be driven and wherein the drive roller unit (99) includes means adapted in response to initial actuation of said electric motor means to automatically lift the drive rollers (1, 1') out of their lowered rest position into their raised drive position in which they are in engagement with the underside of the article (100) to be driven.

* * * * *